United States Patent
Lee et al.

(10) Patent No.: US 7,740,669 B2
(45) Date of Patent: Jun. 22, 2010

(54) REFORMER FOR FUEL CELL SYSTEM, FABRICATION METHOD THEREFOR, AND FUEL CELL SYSTEM COMPRISING THE SAME

(75) Inventors: Jong-Ki Lee, Suwon-si (KR); Zin Park, Suwon-si (KR); Ju-Yong Kim, Suwon-si (KR); Ji-Seong Han, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1380 days.

(21) Appl. No.: 11/123,894

(22) Filed: May 6, 2005

(65) Prior Publication Data

US 2005/0252002 A1 Nov. 17, 2005
US 2006/0080833 A9 Apr. 20, 2006

(30) Foreign Application Priority Data

May 13, 2004 (KR) .................... 10-2004-0033823

(51) Int. Cl.
*B01J 7/00* (2006.01)
*H01M 8/00* (2006.01)
(52) U.S. Cl. ............................. 48/61; 429/12
(58) Field of Classification Search ............ 423/652; 422/211; 48/127.9, 61; 431/127; 29/890; 429/12
See application file for complete search history.

(56) References Cited

U.S. PATENT DOCUMENTS

| 6,766,817 B2 | 7/2004 | da Silva |
| 2003/0091502 A1* | 5/2003 | Holladay et al. ............ 423/652 |
| 2006/0143982 A1* | 7/2006 | Kim et al. ...................... 48/61 |

FOREIGN PATENT DOCUMENTS

| JP | 2002-301381 | 10/2002 |
| JP | 2003-212507 | 7/2003 |
| JP | 2003-265949 | 9/2003 |
| JP | 2003-301295 | 10/2003 |

* cited by examiner

*Primary Examiner*—Alexa D. Neckel
*Assistant Examiner*—Monique Wills
(74) *Attorney, Agent, or Firm*—Christie, Parker & Hale, LLP

(57) ABSTRACT

A reformer for a fuel cell system, a fabrication method thereof, and a fuel cell system are provided. The reformer includes a plurality of reaction substrates. The reaction substrates each have a reaction substrate body provided with a flow channel with micropores formed on the surface of the flow channel. In addition, a catalyst layer may be formed within the flow channel of the reaction substrate body. Since the reformer for a fuel cell system suggested in the present invention includes reaction substrates having micropores formed in the flow channel, it has a high specific surface area and high catalyst activity. Moreover, since the catalyst layer is formed by a deposition method, the reformer can be of a small proportion, occupying little space in the fuel cell system.

21 Claims, 3 Drawing Sheets

REFORMER FOR FUEL CELL SYSTEM, FABRICATION METHOD THEREFOR, AND FUEL CELL SYSTEM COMPRISING THE SAME

CROSS REFERENCE TO RELATED APPLICATION

This application claims priority to and the benefit of Korean Patent Application No. 10-2004-0033823 filed in the Korean Intellectual Property Office on May 13, 2004, which is hereby incorporated by reference in its entirety for all purposes as if fully set forth herein.

FIELD OF THE INVENTION

The present invention relates to a reformer for a fuel cell system, a fabrication method thereof, and a fuel cell system. More particularly, it relates to a reformer for a fuel cell system that includes a reaction substrate having a large active surface area, a fabrication method thereof, and a fuel cell system comprising the reformer.

BACKGROUND OF THE INVENTION

Generally, a fuel cell is an electric power generation system that converts chemical energy directly into electric energy through an electrochemical reaction fueled by hydrogen contained in a hydrocarbon-based organic fuel such as methanol, ethanol or natural gas. Since organic fuel has a high specific energy, a fuel cell system using organic fuel is extremely attractive in the areas of both setup and portability. For example, the specific energy of methanol is 6,232 Wh/kg.

Fuel cells are often categorized as Phosphoric Acid Fuel Cells (PAFC) that operate at around 150 to 200° C., Molten Carbonate Fuel Cells (MCFC) that operate at a high temperature of 600 to 700° C., Solid Oxide Fuel Cells (SOFC) that operate at a high temperature over 1,000° C., and Proton Exchange Membrane Fuel Cells (PEMFC) and Alkaline Fuel Cells(AFC) that operate in a range between room temperature and a temperature not higher than 100° C. The fuel cells operate based on the same fundamental principles. However, the kind of fuel used, the operating temperature, the catalyst and the electrolyte may differ.

Among fuel cells, the PEMFC, which has been developed recently, has excellent output characteristics, fast starting and response characteristics and a low operating temperature compared to other types of fuel cells. It also has a wide application range and can be used as a distributed power source for houses and public buildings or as a small power source for electronic devices. In addition, the PEMFC is useful as a mobile power source, and for example, may be used in a car by using hydrogen obtained by reforming methanol, ethanol or natural gas as fuel.

The basic structure of a PEMFC system includes a fuel cell body called a stack, a fuel tank, a fuel pump and a reformer for generating hydrogen gas by reforming the fuel. Therefore, the PEMFC generates electric energy by supplying the fuel stored in the fuel tank to the reformer, generating hydrogen gas through reformation in the reformer, and causing the hydrogen gas to react with oxidant electro-chemically in the stack.

Fuel cells can also use a Direct Oxidation Fuel Cell (DOFC) scheme that can supply liquid-phase methanol fuel to the stack directly. The fuel cell of the DOFC scheme does not require the reformer, which is different from the PEMFC.

In the above fuel cell system, the stack that generates electricity substantially includes several to scores of unit cells stacked in multi-layers and each unit cell is formed of a membrane-electrode assembly (MEA) and a bipolar plate. The membrane-electrode assembly has an anode and a cathode attached to each other with an electrolyte membrane between them. The bipolar plate acts as a path for supplying hydrogen gas and oxidant, which are required for the reaction of the fuel cell. In addition, the bipolar plate connects the anode and cathode of the membrane-electrode assembly serially. Due to the bipolar plate, hydrogen gas is supplied to the anode whereas oxidant is supplied to the cathode. During the process, the hydrogen gas goes through an electrochemical oxidation reaction in the anode and the oxidant goes through an electrochemical reduction reaction in the cathode. Due to the transfer of electrons during the reactions, electricity is obtained along with heat and water.

The aforementioned reformer eliminates harmful materials such as carbon monoxide which deactivates the fuel cell and shortens the life of the fuel cell, as well as converting hydrogen into hydrogen gas which is needed to generate electricity in the stack by reforming hydrogen-containing fuel with water.

In the case of a fuel cell for mobile applications requiring a reformer, the size of the reformer is so small that the width and depth of a flow channel are between scores of micrometers and scores of millimeters. In this reformer, however, a catalyst layer cannot be formed precisely in a conventional slurry injection method or direct coating method. Moreover, since the specific surface area is small, the reforming effect may not be sufficient.

SUMMARY OF THE INVENTION

In one embodiment of the present invention, a reformer is provided for use in a fuel cell system. The reformer has a reaction substrate body that comprises at least one flow channel formed in the reaction substrate body. The flow channel includes a plurality of micropores formed on its surface. The combination of a flow channel with micropores defines a large active surface area.

In another embodiment of the present invention, a method is disclosed for fabricating a reformer for a fuel cell system.

In yet another embodiment of the present invention, a fuel cell system is provided that comprises the improved reformer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

In accordance with one embodiment of the present invention, a reformer for a fuel cell system includes a plurality of reaction substrates, each of which comprises a reaction substrate body having at least one flow channel with micropores formed on the surface of the flow channel. A catalyst layer is formed within the flow channel of the reaction substrate body, and preferably on a surface of the micropores of the flow channel.

In accordance with another embodiment of the present invention, a method is provided for fabricating a reformer for a fuel cell system. The method comprises the steps of: a) forming a flow channel in the reaction substrate body; b) forming nano-sized micropores by anodizing the surface of the flow channel in the reaction substrate body; c) forming a catalyst layer within the flow channel; and d) stacking and organizing a plurality of reaction substrates.

In accordance with yet another embodiment of the present invention, a fuel cell system is provided comprising: a fuel supplying unit for supplying mixed fuel obtained by mixing fuel with water; a reforming unit for generating hydrogen gas by reforming the mixed fuel; a stack for generating electric energy by performing an electrochemical reaction between hydrogen gas supplied from the reforming unit and oxidant; and an oxidant supplying unit for supplying oxidant to the stack and the reforming unit. The reforming unit comprises a reformer for a fuel cell system having at least one reaction substrate which comprises a reaction substrate body having a flow channel with micropores formed on a surface of the flow channel, and a catalyst layer formed within the flow channel of the reaction substrate body, and preferably on a surface of the micropores of the flow channel. The oxidant is preferably air or oxygen.

Other objects and aspects of the invention will become apparent from the following description of the embodiments with reference to the accompanying drawings.

Figure 1:
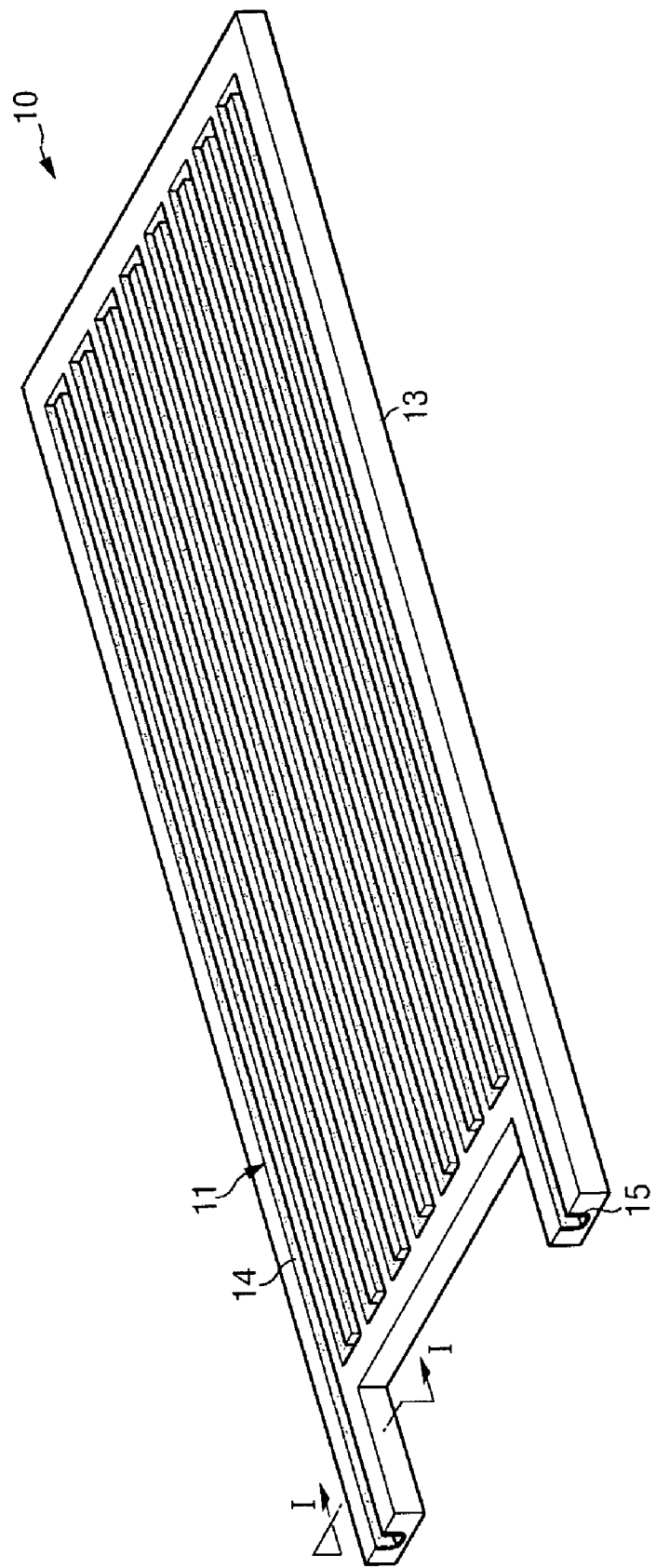
FIG. 1 is a perspective view showing a reaction substrate included in a reformer for a fuel cell system in accordance with an embodiment of the present invention.
Figure 2:
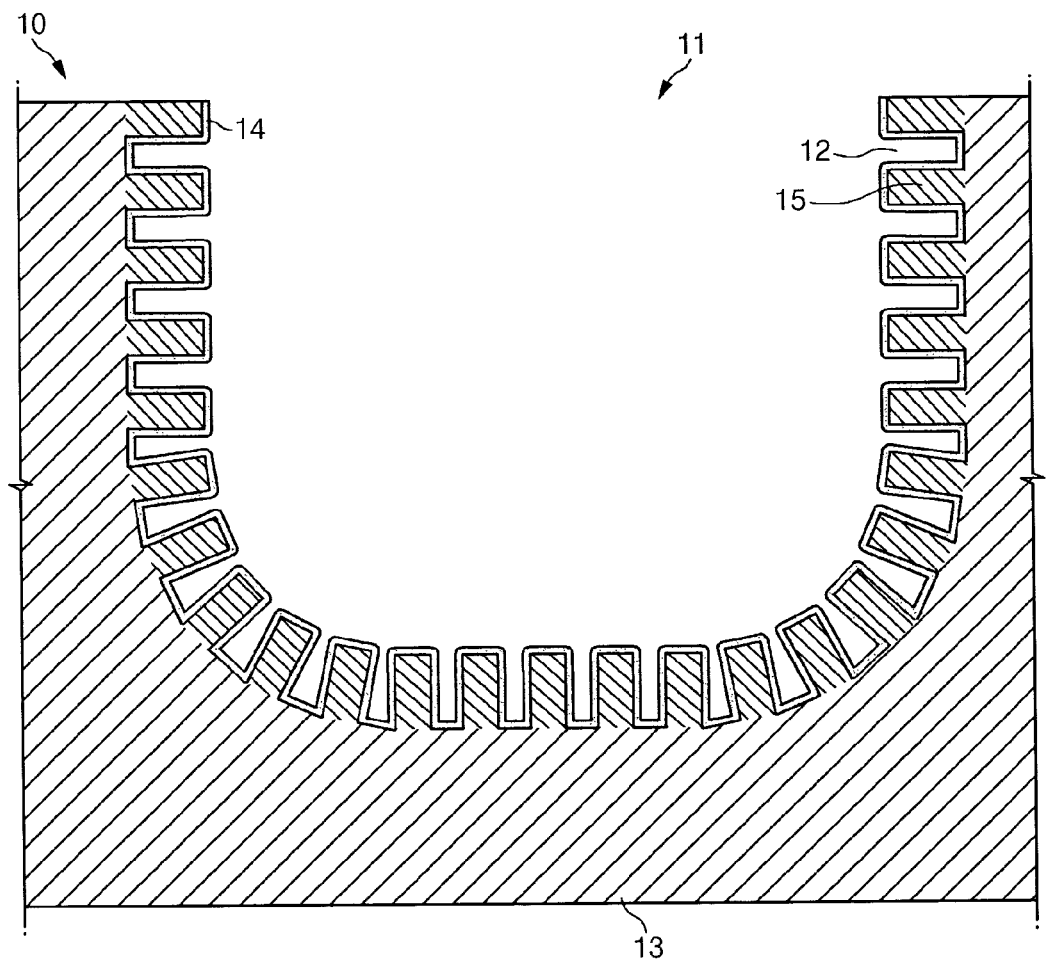
FIG. 2 is a cross-sectional view showing a flow channel of the reaction substrate.

FIG. 1 is a perspective view showing a reaction substrate included in a reformer for a fuel cell system in accordance with an embodiment of the present invention, and FIG. 2 presents a cross-section of the reaction substrate obtained from a line I-I of FIG. 1. However, the reaction substrate included in the reformer of the present invention is not limited to those embodiments shown in FIGS. 1 and 2.

Referring to FIGS. 1 and 2, the reformer of the present invention includes a reaction substrate 10 having a reaction substrate body 13 and a catalyst layer 14. The reaction substrate body 13 includes a flow channel 11 and micropores 12 formed on the surface of the flow channel 11. The catalyst layer 14 is formed within the flow channel 11 of the reaction substrate body 13 and preferably on the surface of the micropores 12 of the flow channel 11.

Optionally, the catalyst layer may be provided on the inner-surface of the micropores 12, and not just within the micropores 12 and on the surface of the flow channel 11.

As shown in FIG. 2, the catalyst layer 14 is formed on the inside surfaces of the micropores 12. Thus, the reaction substrate 10 of an embodiment may have a high specific surface area, and therefore, excellent reaction efficiency even with a small quantity of catalyst.

In some embodiments of the invention, the diameter of the micropores 12 formed in the flow channel 11 may be in the range from about 10 nm to 1,000 nm, more preferably, from about 30 nm to 500 nm, and most preferably, about 30 nm. If the diameter of the micropores is less than 10 nm, it is hard to deposit the catalyst uniformly within the micropores. If the diameter is more than 1,000 nm, the effect of deposition area increase is reduced remarkably.

The depth of the micropores 12 may be in the range from about 50 nm to 3 µm, more preferably, from about 100 nm to 1 µm, and most preferably, from about 100 nm to 500 nm. If the depth of micropores 12 is less than 50 nm, the diameter of the micropores 12 tends to be less than about 10 nm. If the depth is more than 3 µm, the mechanical hardness of the reaction substrate becomes undesirably weak.

The density of the micropores 12 on the surface of the flow channel 11 may be in the range from about $1\times10^5$ to $1\times10^{10}$ micropores/m$^2$ and, more preferably, from about $1\times10^6$ to $1\times10^9$/m$^2$. If the density of the micropores is less than $1\times10^5$/m$^2$, the effect of an increase in the active surface area is insignificant. If the density is more than $1\times10^{10}$/m$^2$, the diameter of the micropores 12 is not more than 10 nm.

The body of the reaction substrate used in the present invention (herein referred to as a reaction substrate body) may comprise at least one metal selected from the group consisting of Al and Al-containing alloys. The Al-containing alloy may comprise at least one alloy selected from the group consisting of Al—Mn, Al—Mg, Al—Cu—Mg, Al—Mg—Si, Al—Si, and Al—Cu—Si alloys.

The reaction substrate body comprises a metal oxide layer 15 generated on the surface from an anodizing process. The metal oxide layer 15 may comprise one or more oxides selected from a group consisting of aluminum oxide(AO) and anodized aluminum oxide (AAO). The thickness of the metal oxide layer is about the same as the depth of the micropores. Therefore, an embodiment may include a metal oxide layer having a thickness in the range from about 50 nm to 3 µm, more preferably from about 100 nm to 1 µm and, most preferably, from about 100 nm to 500 nm. If the thickness of the metal oxide layer 15 is less than 50 nm, the diameter of the micropores 12 is not more than 10 nm. If it is more than 3 µm, the mechanical hardness of the reaction substrate becomes weak.

The catalyst layer included in the reaction substrate of the present invention comprises at least one metal or metal oxide selected from the group consisting of Pt, Ru, Cu, Cu/ZnO, Fe, and Ni.

The thickness of the catalyst layer including the catalyst may be in the range from about 5 nm to 10 µm and, more preferably, the thickness is in the range from about 10 nm to 5 µm. If the thickness of the catalyst layer is less than 5 nm, a sufficient reformation effect is not attained. If it is more than 10 µm, the reformation effect does not significantly increase and the inclusion of additional catalyst is wasteful.

According to one embodiment, the reformer comprises a plurality of the reaction substrates which may be arranged in the form of a stack.

A method for fabricating the reformer may comprise the steps of: a) forming a flow channel in a reaction substrate body; b) forming nano-sized micropores by anodizing a surface of the flow channel in the reaction substrate body; c) forming a catalyst layer in the flow channel having the micropores to prepare reaction substrate; and d) stacking and organizing the reaction substrates.

The reaction substrate body comprises Al, Al-containing alloy or a combination of the two. Suitable Al-containing alloys include alloys selected from the group consisting of Al—Mn, Al—Mg, Al—Cu—Mg, Al—Mg—Si, Al—Si, Al—Cu—Si, and combinations thereof.

First, a flow channel is formed to provide a path for fluid in the reaction substrate body. The method for forming the flow channel is not limited to any specific method and the flow channel can be formed using conventional methods. Similarly, the cross-section, shape, width and depth of the flow channel can be controlled appropriately according to need. The flow channel can have a width or depth less than millimeter.

After the flow channel is formed in the reaction substrate body, micropores are formed by anodizing the surface of the flow channel. The anodizing is performed by exposing the surface of Al or Al-containing alloy to acid electrolyte and oxidizing the surface by applying voltage. When Al penetrates the electrolyte through the anode, a metal oxide layer is formed on the surface. Preferably, the metal oxide layer is a thin film of $Al_2O_3$. If the voltage is sufficiently high, a porous film is formed. The porous film is the result of the destruction of a thin surface film combined with an erosion process. The heat generated from the destruction of the thin film promotes the erosion process of the electrolyte.

The size, depth and density of the micropores formed in the flow channel can be controlled by changing the current supply time. If the current is supplied for a long time, the size and depth of the micropores are increased. If the current is supplied for a short time, the size and depth of the micropores are decreased. Furthermore, if the current is supplied for a short time, the density of the micropores is increased and if the current is supplied for a long time, the density is decreased.

In some embodiments, the electrolyte may comprise oxalic acid, sulfuric acid, or chromic acid.

In order to form the micropores only in the flow channel of the reaction substrate body, the surface of the reaction substrate body except for the part where the flow channel is formed is coated with an acid-resistant nonconductor that can be easily removed after anodizing. Subsequently, the part where the flow channel is formed is anodized and then the coating material is removed. In some embodiments, the coating material is a polymer resin such as epoxy or silicon rubber.

A catalyst layer is formed within the flow channel of the reaction substrate body in which the micropores are formed on the surface using an anodizing method. A deposition method may be used to form the catalyst layer. Deposition methods include, but are not limited to powder deposition methods, sputtering, thermal Chemical Vapor Deposition (CVD), Plasma Enhanced CVD (PECVD), thermal evaporation, e-beam deposition and combinations thereof. In one embodiment, the deposition method is used as its use does not require the use of a binder.

Preferably, the catalyst layer is formed of a catalyst selected from the group consisting of Pt, Ru, Cu, Cu/ZnO, Fe, Ni and combinations thereof.

The reformer for a fuel cell system of the present invention can be formed by stacking and organizing the reaction substrates fabricated as above. The stacking and organizing follow conventional reformer fabricating methods.

Figure 3:
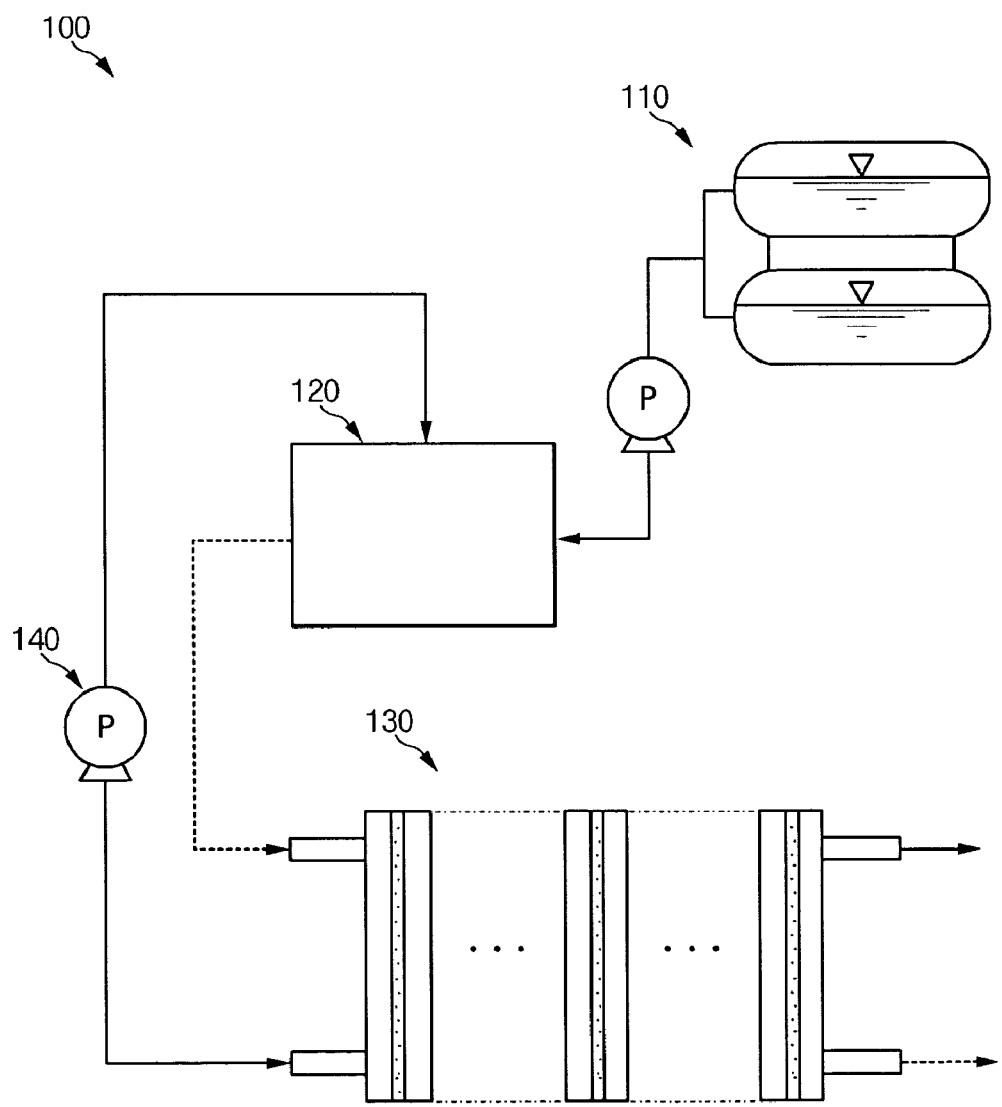
FIG. 3 is a schematic diagram illustrating a fuel cell system in accordance with an embodiment of the present invention.

FIG. 3 is a schematic diagram illustrating a fuel cell system in accordance with an embodiment of the present invention.

Referring to FIG. 3, the fuel cell system 100 of the present invention comprises a fuel supplying unit 110, a reforming unit 120, a stack 130, and an oxidant supplying unit 140. The fuel supplying unit 110 supplies a mixed fuel of fuel and water. The reforming unit 120 generates hydrogen gas by reforming the mixed fuel as described above. The stack 130 generates electric energy by performing an electrochemical reaction between the hydrogen gas provided from the reforming unit 120 and oxidant. The oxidant supplying unit 140 supplies oxidant to both the reforming unit 120 and the stack 130.

The following examples further illustrate the present invention in detail but are not to be construed to limit the scope thereof.

EXAMPLE 1

A flow channel having a width of 0.8 mm and a depth of 0.8 mm was formed on one surface of a reaction substrate body comprising a plate of 99% aluminum. The shape of the flow channel was as shown in FIG. 1. Except the part where the flow channel was formed, the surface of the reaction substrate body was coated with epoxy resin. Then, the reaction substrate body was impregnated with 5 wt % oxalic acid ($H_2C_2O_4$) aqueous solution and anodized at 30° C. by supplying an alternating current (AC) of 60 V. The current density was 3 $A/dm^2$ and the anodizing time was 40 minutes.

After anodizing, the epoxy resin coating was removed, and micropores formed in the flow channel were observed by using a scanning electron microscope (SEM). The depth of the formed micropores and the thickness of the formed metal oxide layer averaged 2 μm.

Subsequently, a catalyst layer was formed by sputtering Pt on the flow channel of the reaction substrate body in which the micropores are formed on the surface of the flow channel. The formed Pt layer was 1 μm-thick.

A reformer for a fuel cell system was fabricated by forming a plurality of reaction substrates and stacking and organizing them.

EXAMPLE 2

Reaction substrates were formed in the same manner as in the Example 1 except an Al—Mn alloy containing 1.2 wt % Mn was used as a reaction substrate body.

After anodizing, the epoxy resin coating was removed and micropores formed in the flow channel were observed by using a SEM. The depth of the formed micropores and the thickness of the formed metal oxide layer averaged 0.8 μm.

COMPARATIVE EXAMPLE 1

Reaction substrates were formed in the same manner as in the Example 1 to fabricate a reformer for a fuel cell system, with the exception of not forming micropores in the flow channel of the reaction substrate body.

COMPARATIVE EXAMPLE 2

Reaction substrates were formed in the same manner as in the Comparative Example 1 to fabricate a reformer for a fuel cell system, except that a Pt catalyst was coated with slurry.

The reformation effects of the reformers fabricated according to the Examples 1 and 2 and the Comparative Examples 1 and 2 were measured and the concentrations (in volume %) of hydrogen, carbon dioxide and carbon monoxide in the reformed gas are presented in Table 1 below.

TABLE 1

|  | Example 1 | Example 2 | Comparative Example 1 | Comparative Example 2 |
|---|---|---|---|---|
| $H_2$ (vol %) | 74.842 | 74.688 | 74.535 | 74.542 |
| $CO_2$ (vol %) | 25.012 | 25.064 | 25.047 | 25.102 |
| CO (vol %) | 0.146 | 0.158 | 0.418 | 0.356 |

As shown in Table 1, the reformed gas obtained from the reformers fabricated according to the Examples 1 and 2 contained a higher level of hydrogen gas and a lower level of carbon monoxide than the reformed gas obtained from the reformers of the comparative examples 1 and 2, thus showing an excellent efficiency.

Since the reformer for a fuel cell system suggested in the present invention includes reaction substrates having micropores formed in the flow channel, the specific active surface area is high. Moreover, since a catalyst layer is formed using a deposition method, the reformer can be made quite small.

The present invention has been described in detail with reference to certain preferred embodiments. It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A reformer for a fuel cell system, comprising:
a plurality of reaction substrates each of which comprises a reaction substrate body having a flow channel with micropores on a surface of the flow channel, wherein the reaction substrate body comprises a material selected from the group consisting of aluminum, aluminum-containing alloys selected from the group consisting of Al—Mn, Al—Mg, Al—Cu—Mg, Al—Mg—Si, Al—Si, Al—Cu—SiU, and combinations thereof; and
a catalyst layer within the flow channel.

2. The reformer of claim 1, wherein the reaction substrate body further comprises a metal oxide layer.

3. The reformer of claim 2, wherein the metal oxide layer comprises a material selected from the group consisting of aluminum oxide (AO), anodized aluminum oxide (AAO), and combinations thereof.

4. The reformer of claim 2, wherein the metal oxide layer is of a thickness between about 50 nm and about 3 μm.

5. The reformer of claim 4, wherein the metal oxide layer is of a thickness between about 100 nm and about 1 μm.

6. The reformer of claim 1, wherein the catalyst layer comprises a material selected from the group consisting of Pt, Ru, Cu, Cu/ZnO, Fe, Ni, and combinations thereof.

7. The reformer of claim 1, wherein the catalyst layer is of a thickness between about 5 nm and about 10 μm.

8. The reformer of claim 7, wherein the catalyst layer is of a thickness between about 10 nm and about 5 μm.

9. The reformer of claim 1, wherein the plurality of reaction substrates are arranged in a stack.

10. The reformer of claim 1, wherein the reaction substrate further comprises a catalyst layer formed on a surface of the micropores.

11. The reformer of claim 1, wherein the micropores have diameters from about 10 nm to about 1,000 nm.

12. The reformer of claim 11, wherein the micropores have diameters from about 30 nm to about 500 nm.

13. The reformer of claim 1, wherein the micropores have depths from about 50 nm to about 3 μm.

14. The reformer of claim 13, wherein the micropores have depths from about 100 nm to about 1 μm.

15. The reformer of claim 1, wherein the micropores are present in a density from about $1 \times 10^5$ to about $1 \times 10^{10}/m^2$.

16. The reformer of claim 15, wherein the micropores are present in a density from about $1 \times 10^6$ to about $1 \times 10^9/m^2$.

17. A method for fabricating a reformer for a fuel cell system, comprising:
forming a flow channel in a reaction substrate body, the reaction substrate body comprising a material selected from the group consisting of aluminum, and aluminum-containing alloys selected from the group consisting of Al—Mn, Al—Mg, Al—Cu—Mg, Al—Mg—Si, Al—Si, and Al—Cu—Si, and combinations thereof;
forming micropores within the flow channel by anodizing a surface of the flow channel;
forming a catalyst layer within the flow channel; and
arranging a plurality of reaction substrates in a stack.

18. The method of claim 17, wherein the catalyst layer is formed by a deposition method.

19. The method of claim 18, wherein the deposition method is selected from the group consisting of powder deposition methods, sputtering, thermal Chemical Vapor Deposition (CVD), Plasma Enhanced CVD (PECVD), thermal evaporation, and e-beam deposition.

20. The method of claim 17, wherein the catalyst layer comprises a material selected from the group consisting of Pt, Ru, Cu, Cu/ZnO, Fe, Ni, and combinations thereof.

21. A fuel cell system, comprising:
a fuel supplying unit for supplying mixed fuel;
a reforming unit comprising:
a reformer comprising a plurality of reaction substrates each of which comprises a reaction substrate body having at least one flow channel and micropores on a surface of the at least one flow channel, the reaction substrate body comprising a material selected from the group consisting of aluminum, aluminum-containing alloys selected from the group consisting of Al—Mn, Al—Mg, Al—Cu—Mg, Al—Mg—Si, Al—Si, Al—Cu—SiU, and combinations thereof; and
a catalyst layer within the micropores of the at least one flow channel of each reaction substrate body;
a stack for generating electric energy by an electrochemical reaction between hydrogen gas supplied from the reforming unit and oxidant; and
an oxidant supplying unit for supplying oxidant to the stack and the reforming unit.

\* \* \* \* \*